March 7, 1961 J. A. KAUFFMANN 2,974,311

MAGNETIC REGISTER

Filed Oct. 22, 1958

INVENTOR.
JOHN A. KAUFFMANN

BY William V. Sehelberg

AGENT

United States Patent Office 2,974,311

Patented Mar. 7, 1961

2,974,311

MAGNETIC REGISTER

John A. Kauffmann, Hyde Park, N.Y., assignor to International Business Machines Corporation, New York, N.Y., a corporation of New York Filed Oct. 22, 1958, Ser. No. 768,995

9 Claims. (Cl. 340—174)

This invention relates to shifting registers and more specifically to a high speed pulse type shifting register employing magnetic bistable components which does not require the use of diodes in the transfer loops.

In the present day electronic computers, shifting registers are utilized to help perform a multitude of functions, such as multiplication, division and delay. The prior art is replete with shifting registers which utilize magnetic core components, and recently the diodes, employed in the transfer loops to prevent retrograde transfer of information, have been eliminated by various circuit and pulsing techniques. Such a diodeless type shifting register may be found in a copending application Serial No. 528,594, filed on August 16, 1955, in behalf of Louis A. Russell, now Patent No. 2,907,987. In this type shifting register, in order to prevent retrograde transfer of information, certain ones of the cores are reset slowly necessarily limiting the speed at which information may be shifted. It has been found, however, that the slow resetting can be eliminated and high speed operation attained by providing three stages per bit with each stage comprising two cores, one of which has a greater volt-seconds capacity.

Accordingly, it is then an object of this invention to provide a shifting register capable of attaining high speeds of operation utilizing magnetic bistable components without the necessity of employing diodes in the transfer loop.

Another object of this invention is to provide a magnetic core high speed shifting register having three stages for each bit of information to be shifted with two cores per stage.

Yet another object of this invention is to provide a shifting register capable of shifting binary information at high speeds having three stages per bit and two cores per stage wherein one core in each stage has a greater volt-seconds capacity than the other.

These and other objects may be realized by constructing a shifting register in accordance with this invention wherein each stage comprises an input storage magnetic core and a buffer storage magnetic core. Each of the storage and buffer cores have winding means thereon with circuit means connecting an output winding on each storage core with a control winding, adapted to act as an input and an output winding, on the buffer core in one sense, and an input winding on the storage core of the next stage in an opposite sense. By simultaneously resetting the buffer core of one stage and the storage core of the next succeeding stage, retrograde transfer of information is eliminated without the necessity of a diode in the transfer loop. Further, in order to insure proper forward transfer of information with cancellation of retrograde transfer flow, the buffer storage core is provided with a greater amount of magnetic material which exhibits a switching threshold approximately twice that of the storage cores and a greater volt-seconds capacity.

Other objects of the invention will be pointed out in the following description and claims and illustrated in the accompanying drawings, which disclose, by way of example, the principle of the invention and the best mode, which has been contemplated, of applying that principle.

Figure 1:
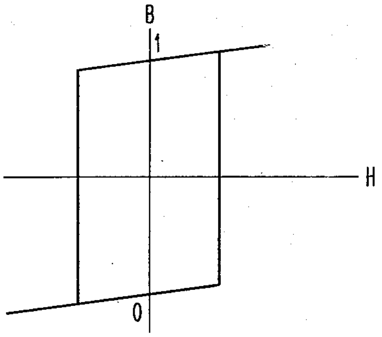
Fig. 1 is a representation of the hysteresis characteristic obtained for material of the type employed.

Referring to the Fig. 1, the curves illustrated comprise an idealized plot of flux density B versus applied field H for magnetic core materials having a substantially rectangular hysteresis characteristic. The opposite remanence states are conventionally employed for representing binary information and are arbitrarily designated as "0" and "1" in the figure. With a "0" stored, a pulse applied to a winding linking the core in proper sense causes the loop to be traversed and the remanence state "1" is attained when the pulse terminates. Such a pulse is hereinafter referred to as a "write" pulse. Similarly, the core is read out or returned to the "0" state in determining what information has been stored by applying a pulse in reverse sense to the same or another winding. Such a pulse is hereinafter referred to as a "read" pulse. Should a "1" have been stored, a large flux change occurs with the shift from the "1" to "0" conditions with a corresponding voltage magnitude developed on the output winding. On the other hand, should a "0" have been stored, little flux change occurs and negligible signal is developed in the output winding. A dot marking is shown adjacent when winding terminal of each of the windings shown in Fig. 2, indicating its winding direction, in that a positive pulse directed into the dotted end tends to apply a negative field or store a "0," termed a read pulse, while a positive pulse directed into the unmarked end tends to store a "1," termed a write pulse.

The arrangement disclosed employs input and output storage magnetic cores intermediate to buffer storage magnetic cores which store certain logical information. The storage cores may be fabricated of ferrite materials like the buffer storage cores, however, should have a coercive force threshold approximately half that exhibited by the buffer storage cores.

Figure 2:
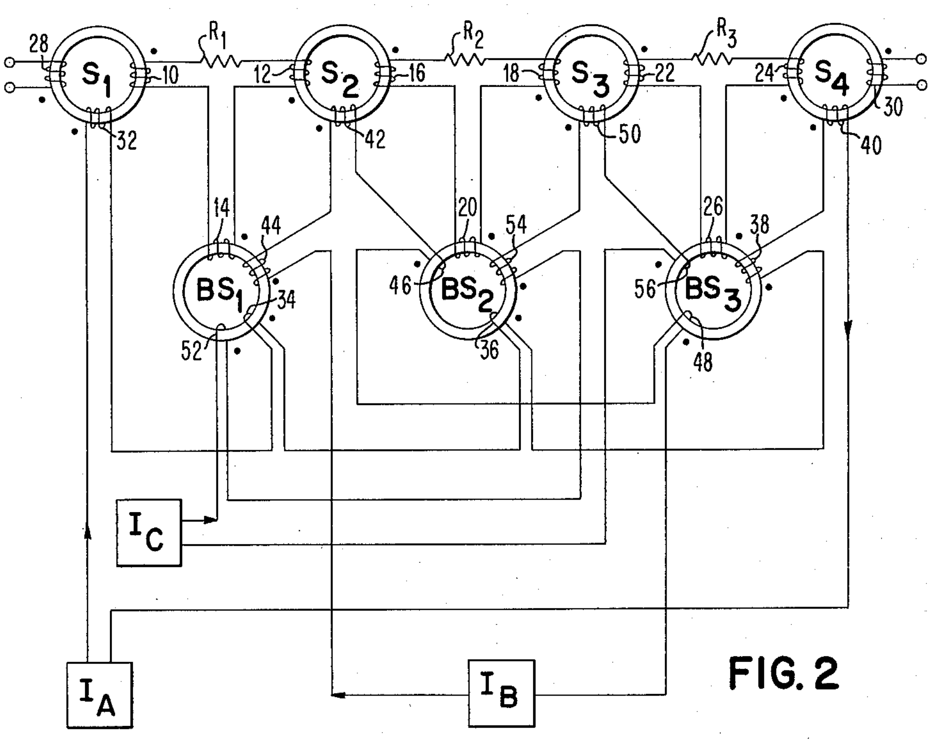
Fig. 2 is a circuit diagram of a magnetic core shifting register in accordance with this invention.

Referring to the Fig. 2, such interconnecting storage magnetic cores are illustrated in the circuit and labeled $S_1$, $S_2$, $S_3$ and $S_4$ for clarity. A number of buffer storage cores arranged intermediate each of the aforementioned storage cores are shown and labeled $BS_1$, $BS_2$ and $BS_3$. The storage core $S_1$ is provided with an output winding 10 interconnected with an input winding 12 on the core $S_2$, through a resistor $R_1$ and a control winding 14 on the core $BS_1$, which interconnection will hereinafter be referred to as loop A. The storage core $S_2$ is further provided with an output winding 16 interconnected with an input winding 18 on the core $S_3$ through a resistor $R_2$, and a control winding 20 on the core $BS_2$, which interconnection will hereinafter be referred to as loop B. The storage core $S_3$ is further provided with an output winding 22 interconnected with an input winding 24 on the core $S_4$ through a resistor $R_3$, and a control winding 26 on the core $BS_3$, which interconnection will hereinafter be referred to as loop C. Information input is provided by an input winding 28 on the core $S_1$, while an output is obtained from an output winding 30 on the core $S_4$. Each of the buffer storage cores $BS_1$, $BS_2$ and $BS_3$ and the storage cores $S_1$ and $S_4$ are energized from a clock pulse source $I_A$, while each of the buffer storage cores $BS_1$, $BS_2$ and $BS_3$ and the storage core $S_2$ are energized by a clock pulse source $I_B$, and the storage core $S_3$ with the buffer storage cores $BS_1$, $BS_2$ and $BS_3$ are energized by a clock pulse source $I_C$. A winding 32 on the core $S_1$, a winding 34 on the core $BS_1$, a winding 36 on the core $BS_2$, a winding 38 on the core $BS_3$ and a winding 40 on the core $S_4$ are series connected with the source $I_A$. A winding 42 on the core $S_2$, a winding 44 on the core $BS_1$, a winding 46 on the core $BS_2$ and a winding 48 on the core $BS_3$ are connected with the source $I_B$, while a winding 50 on the core $S_3$, a winding 52 on the core $BS_1$, a winding 54 on the core $BS_2$ and a winding 56 on the core $BS_3$ are connected with the source $I_C$.

Figure 3:
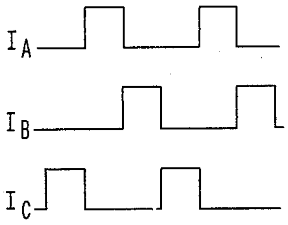
Fig. 3 illustrates the relative timing of current pulses which are required for operating the circuit of Fig. 2.

The sequence of pulses provided by the several clock pulse sources described above is indicated in the Fig. 3, and to explain the operation of the shift register circuit shown in the Fig. 2, assume all cores are in the lower remanence condition or "0" state, except the cores $S_1$ and $BS_1$ which are assumed to be in the upper remanence condition, or "1" state.

Upon operation of the $I_A$ clock pulse source, a signal is directed into the windings 32, 34, 36, 38 and 40 on the cores $S_1$, $BS_1$, $BS_2$, $BS_3$ and $S_4$, respectively, which tends to read the cores $S_1$ and $S_4$ and to bias the cores $BS_1$, $BS_2$ and $BS_3$ towards the write "1" state threshold. The core $S_1$ is reset from the "1" to the "0" state, and in so doing induces a voltage on the ouput winding 10 with its dotted end positive causing a clockwise current in loop A. This clockwise current in loop A tends to write the core $S_2$ and read the core $BS_1$. Since the core $BS_1$ has a high threshold and is pulse biased to write threshold by the $I_A$ clock pulse applied to its winding 34, it will not switch unless the current in loop A exceeds $$2\frac{Io}{N}$$

where $Io$ is the threshold current for a one turn winding and N is the number of turns in the winding 14 on the core $BS_1$. Since it is desired that $BS_1$ remain unchanged at this time, the circuit is designed so that the current in the loop A does not exceed this magnitude. To reduce the net ampere turns on the core $BS_1$, the number of turns in the winding 14 are less than the number of turns in the winding 12 on the core $S_2$, thus the core $S_2$ is switched from the "0" to the "1" state and in so doing induces the voltage on its output winding 16 with the undotted end positive causing a counter-clockwise current in loop B which tends to write the core $BS_2$ and read the core $S_3$. Since the core $S_3$ is already in the "0" state and the core $BS_2$ is biased toward the "1" state by the $I_A$ clock pulse applied to its winding 36, the core $BS_2$ is switched from the "0" to the "1" state. Upon termination of the $I_A$ clock pulse, the cores $BS_1$, $S_2$ and $BS_2$ are left in the "1" state while the remaining cores are left in the "0" state. The $I_B$ clock pulse source now operates to direct a read signal into the windings 42 and 44 on the cores $S_2$ and $BS_1$, respectively, and write bias signal into the windings 46 and 48 on the cores $BS_2$ and $BS_3$, respectively, which write bias signal, biases the cores $BS_2$ and $BS_3$ toward the write one direction. The cores $S_2$ and $BS_1$ are reset from the "1" to the "0" state and in so doing induce a voltage on their windings 12 and 14, respectively, with their dotted end positive. The induced voltages on the windings 12 and 14 are opposite in sense and in order to insure there is no back transfer, it is desirable that the voltage appearing on the winding 14 of the core $BS_1$ be at least equal to, or greater than, the voltage appearing on the winding 12 of the core $S_2$ to provide at least cancellation or a counter-clockwise current flow in the loop A which would drive the core $S_1$ further into the "0" state. Since the number of turns in the winding 14 are made less than those in the winding 12 as described previously, and the induced voltages must be at least equal, twice as much core material is used for the core $BS_1$ as compared with the core $S_2$. Further, the cancellation action not only prevents back transfer but helps unload the core $S_2$ at this time. The core $S_2$ in being reset also induces a voltage on its output winding 16 with its dotted end positive causing a clockwise current in loop B which tends to write the core $S_3$ and read the core $BS_2$. Since the core $BS_2$ is biased toward the "1" state by the $I_B$ clock pulse applied to its winding 46, operation is as described above for application of the $I_A$ clock pulse which reset the core $S_1$, and the core $S_3$ is switched from the "0" to the "1" state, to induce a voltage on its output winding 22 with the undotted end positive causing a counter-clockwise current in loop C which tends to write the core $BS_3$ and read the core $S_4$. Since the core $S_4$ is already in the "0" state, the core $BS_3$ is switched from the "0" to the "1" state. Upon termination of the $I_B$ clock pulse, the cores $BS_2$, $S_3$ and $BS_3$ are left in the "1" state while the remaining cores are left in the "0" state, and the $I_C$ clock pulse source operates to direct a read signal into the windings 50 and 54 on the cores $S_3$ and $BS_2$, respectively, and a write signal into the windings 52 and 56, on the cores $BS_1$ and $BS_3$, respectively, which biases both of the cores $BS_1$ and $BS_3$ toward the "1" state. The cores $BS_2$ and $S_3$ are reset from the "1" to the "0" state and in so doing induce a voltage on the windings 20 and 18, respectively, in the loop B, with the dotted end positive, which voltages are opposite in sense and approximately equal causing little current flow in loop B. Simultaneously, the core $S_3$ in being reset, causes an induced voltage on the winding 22 with its dotted end positive causing a clockwise current in loop C which tends to write the core $S_4$ and read the core $BS_3$. Since the core $BS_3$ is biased by the $I_C$ clock pulse applied to the winding 56 in the "1" state, it is uneffected and the core $S_4$ is switched from the "0" to the "1" state inducing a voltage on the output winding 30 of the core $S_4$ with its undotted end positive. If we now consider the core $S_4$ to be similar to the core $S_1$, we realize that a further buffer storage core would be switched to the "1" state or information could be obtained at this time from the winding 30 of the core $S_4$. Thus a bit of information has been shifted with the application of a three phase clock system utilizing two cores per stage and three stages per bit.

In the interest of providing a complete disclosure, details of one embodiment of this invention wherein ferrite cores are employed is given below, however it is understood that other component values and current magnitudes may be employed with satisfactory operation attained so that the values given should not be considered limiting.

With the clock pulse currents $I_A$, $I_B$ and $I_C$ delivering a constant current of 1.2 amperes, the windings 32, 40, 42 and 50 may comprise four turns, the windings 38, 44 and 54 may comprise three turns and the windings 34, 36, 46, 48, 52 and 56 may comprise one turn. In the coupling circuits interconnecting the storage and coupling cores, the windings 10, 16, 22 and 30 may comprise twelve turns, the windings 12, 18, 24 and 28 may comprise ten turns and the windings 14, 20 and 26 may comprise six turns with the resistors $R_1$, $R_2$ and $R_3$ of 1 ohm.

Each of the storage and buffer storage cores may comprise toroids of magnesium-manganese ferrite compositions having an outside diameter of 0.100 inch, inside diameter of 0.070 inch, with the storage cores having a thickness of 0.060 inch and the buffer storage cores having a thickness of 0.120 inch with the switching threshold of the storage cores being 1.2 oersteds and that of the buffer cores being 2.4 oersteds. The different thickness may be obtained by stacking cores each of 0.030 inch thick and winding the stack as a single core unit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. An information handling shifting register comprising, a first, a second and a third stage, each of said stages comprising a bistable storage magnetic core and a bistable buffer magnetic core, winding means including input and output windings on each of said storage cores, control winding means on each of said buffer cores, means connecting the output winding of said storage cores with the control winding means of said buffer cores and the input winding of the succeeding stage storage core in a bidirectional current conductive circuit loop, and means for simultaneously establishing the buffer core of one stage and the storage core of the succeeding stage in a datum stable state whereby information is transferred from one of said stages to another.

2. A register as set forth in claim 1, wherein said buffer cores have a greater volt-seconds capacity than said storage cores.

3. A register as set forth in claim 2, wherein said buffer cores have a greater coercive force threshold than said storage cores.

4. A shifting register having three stages for each bit of information to be shifted comprising, a first and a second magnetic core for each of said stages capable of attaining bistable states of residual flux density, input and output winding means on each of said first cores, control winding means on each of said second cores adapted to act as an input and an output winding, circuit means including a resistor connecting the output winding on said first cores with the control winding on said second cores in one sense and the input winding on the first core of the succeeding stage in an opposite sense, a first group of windings comprising a shift winding on said first core of said first stage serially connected with a bias winding on the second core of said first stage and a bias winding on the second core of said second stage and a shift winding on the second core of said third stage adapted to shift the first core of said fist stage and the second core of said third stage to a datum stable state and to bias the second core of said first and second stages toward an opposite stable state when energized, a second group of windings comprising a shift winding on the second core of said first stage serially connected with a shift winding on the first core of the second stage and a bias winding on the second core of said second stage and a bias winding on the second core of said third stage adapted to cause the second core of said first stage and the first core of said second stage to shift to the datum stable state and to bias the second core of said second and third stages toward an opposite stable state when energized, and a third group of windings comprising a shift winding on the second core of second stage series connected with a shift winding on the first core of said third stage and a bias winding on the second core of said first stage and a bias winding on the second core of said third stage adapted to cause the second core of said second stage and the first core of said third stage to shift to the datum state and to bias the second cores of said first and third stages toward the opposite state when energized.

5. A register as set forth in claim 4 including means for energizing said first, second and third groups of windings in sequence in the order named.

6. A register as set forth in claim 5 wherein said circuit means is a series circuit connecting the input winding on said first core, the control winding on the second core of each stage, the input winding on the first core of the succeeding stage and the resistor only.

7. A register as set forth in claim 4 wherein each of the second cores in each stage is of a greater volt-seconds capacity than said first cores.

8. A register as set forth in claim 4 wherein the second core of each stage is made of material having a greater coercive force threshold than said first cores.

9. The register of claim 3, wherein the output winding of said storage cores and the input winding on the succeeding storage core are connected in series aiding relationship while the control winding means of said buffer cores are connected in series opposition relationship.

References Cited in the file of this patent

UNITED STATES PATENTS

| | | |
|---|---|---|
| 2,708,722 | An Wang | May 17, 1955 |
| 2,781,503 | Saunders | Feb. 12, 1957 |
| 2,784,390 | Kun Li Chien | Mar. 5, 1957 |